United States Patent
Nordbruch

(10) Patent No.: US 10,311,732 B2
(45) Date of Patent: Jun. 4, 2019

(54) CONCEPT FOR CHECKING A SENSOR SYSTEM FOR DETECTING AN OCCUPANCY STATE OF A PARKING SPACE FOR ERRORS

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 11 days.

(21) Appl. No.: 15/813,257

(22) Filed: Nov. 15, 2017

(65) Prior Publication Data

US 2018/0158333 A1  Jun. 7, 2018

(30) Foreign Application Priority Data

Dec. 7, 2016  (DE) .................. 10 2016 224 351

(51) Int. Cl.
*G08G 1/14* (2006.01)
*G01S 7/41* (2006.01)
(Continued)

(52) U.S. Cl.
CPC .............. *G08G 1/143* (2013.01); *G01S 7/003* (2013.01); *G01S 7/412* (2013.01); *G06K 9/00812* (2013.01); *G01S 7/411* (2013.01); *G01S 7/4802* (2013.01); *G01S 7/539* (2013.01); *G01S 13/86* (2013.01); *G01S 17/936* (2013.01);
(Continued)

(58) Field of Classification Search
CPC ......... G08G 1/143; G01S 7/003; G01S 7/412; G01S 7/411; G01S 7/4802; G01S 7/539; G01S 2013/9314; G01S 2013/936; G01S 2013/9364; G01S 2013/9367;
(Continued)

(56) References Cited

U.S. PATENT DOCUMENTS

| | | | |
|---|---|---|---|
| 9,274,525 B1 | 3/2016 | Ferguson et al. | |
| 2002/0077752 A1* | 6/2002 | Burreson | G01D 5/251 701/300 |
| 2014/0340242 A1* | 11/2014 | Belzner | G08G 1/14 340/932.2 |

FOREIGN PATENT DOCUMENTS

| | | | |
|---|---|---|---|
| DE | 102014217567 A1 | 3/2016 | |
| EP | 2136346 A2 | 12/2009 | |

(Continued)

*Primary Examiner* — Steven Lim
*Assistant Examiner* — Mancil Littlejohn, Jr.
(74) *Attorney, Agent, or Firm* — Norton Rose Fulbright US LLP; Gerard Messina

(57) ABSTRACT

A method for checking for errors of a sensor system, within a vehicle, for detecting an occupancy state of a parking space. The method includes providing a reference data set for a parking space ascertained independently of the sensor system to be checked, the reference data set including a reference occupancy state of the parking space which is assigned a first detection point in time; receiving an occupancy state of the parking space detected with the aid of the sensor system via a communication network which is assigned a second detection point in time; a time difference between the first and second detection points in time is compared to a threshold value, and when the ascertained time difference is less than or less than/equal to the threshold value, the detected occupancy state of the parking space is compared to the reference occupancy state to check the sensor system for errors.

10 Claims, 2 Drawing Sheets

(51) Int. Cl.
   *G01S 7/48*        (2006.01)
   *G01S 7/00*        (2006.01)
   *G06K 9/00*        (2006.01)
   *G01S 13/86*           (2006.01)
   *G01S 13/93*           (2006.01)
   *G01S 15/93*           (2006.01)
   *G01S 17/93*           (2006.01)
   *G01S 7/539*           (2006.01)

(52) U.S. Cl.
   CPC . *G01S 2013/936* (2013.01); *G01S 2013/9314* (2013.01); *G01S 2013/9364* (2013.01); *G01S 2013/9367* (2013.01); *G01S 2013/9385* (2013.01); *G01S 2015/932* (2013.01)

(58) Field of Classification Search
   CPC ...... G01S 2013/9385; G01S 2015/932; G06K 9/00812
   See application file for complete search history.

(56) References Cited

FOREIGN PATENT DOCUMENTS

| | | | | |
|---|---|---|---|---|
| EP | 2922033 A1 | * | 9/2015 | .......... B60W 50/082 |
| GB | 2550050 A | | 11/2017 | |

* cited by examiner

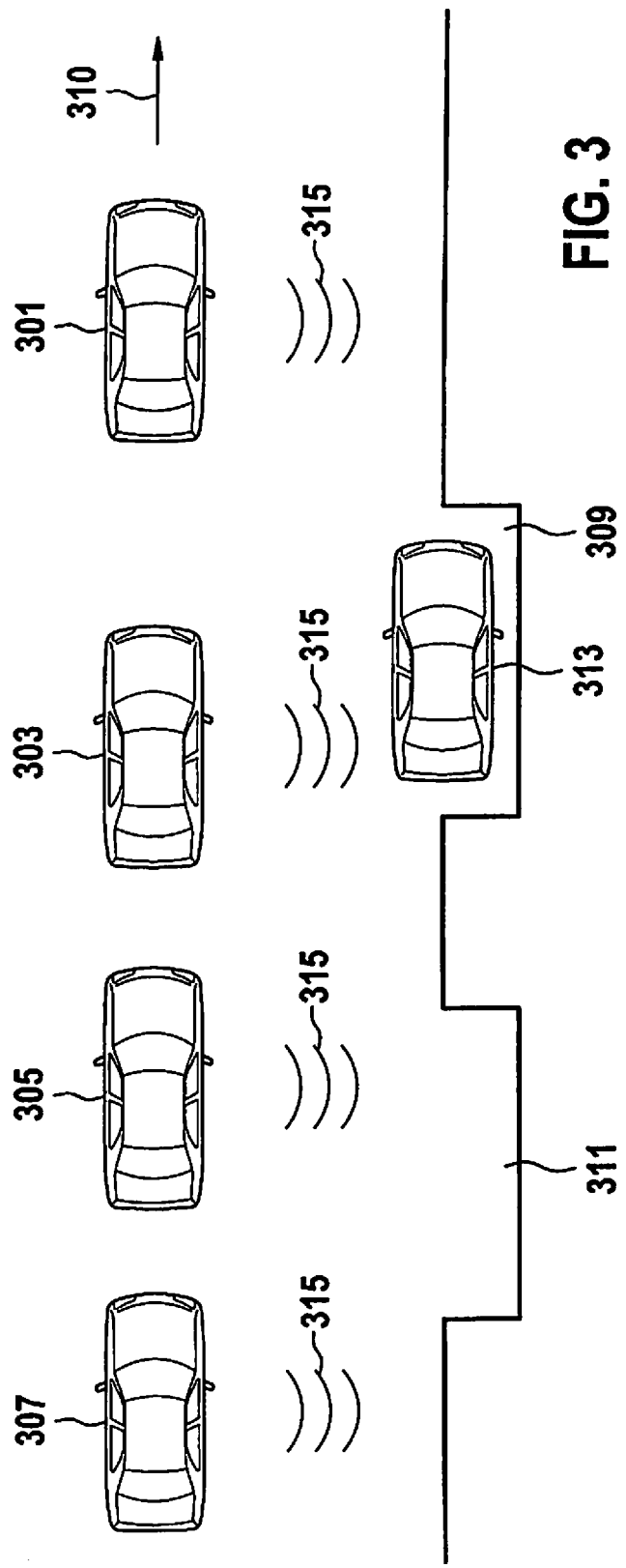

CONCEPT FOR CHECKING A SENSOR SYSTEM FOR DETECTING AN OCCUPANCY STATE OF A PARKING SPACE FOR ERRORS

CROSS REFERENCE

The present application claims the benefit under 35 U.S.C. § 119 of German Patent Application No. DE 102016224351.9 filed on Dec. 7, 2016, which is expressly incorporated herein by reference in its entirety.

FIELD

The present invention relates to a method and to a device for checking a sensor system for detecting an occupancy state of a parking space for motor vehicles, which is included in a motor vehicle, for errors. The present invention moreover relates to a motor vehicle and to a computer program.

BACKGROUND INFORMATION

German Patent Application No. DE 10 2014 217 567 A1 describes a method and a server for mapping a parking space.

European Patent Application No. EP 2 136 346 A2 describes a parking guidance system for navigating a vehicle searching for a parking space to a free parking space.

SUMMARY

An object of the present invention is to provide a way to efficiently check a sensor system for detecting an occupancy state of a parking space for motor vehicles, which is included in a motor vehicle, for errors.

This object may be achieved in accordance with the present invention. Advantageous embodiments of the present invention are described herein.

According to one aspect of the present invention, a method for checking a sensor system for detecting an occupancy state of a parking space for motor vehicles, which is included in a motor vehicle, for errors is provided, including the following steps:

providing a reference data set for a parking space ascertained independently of the sensor system to be checked, the reference data set including a reference occupancy state of the parking space, the reference occupancy state being assigned a first detection point in time which indicates when the reference occupancy state was detected;

receiving an occupancy state of the parking space detected with the aid of the sensor system of the motor vehicle via a communication network, the occupancy state being assigned a second detection point in time which indicates when the occupancy state was detected with the aid of the sensor system, the second detection point in time being chronologically after the first detection point in time;

ascertaining a time difference between the first and the second detection points in time;

comparing the ascertained time difference to a predetermined time difference threshold value, and when the ascertained time difference is less than or less than/equal to the predetermined time difference threshold value, comparing the detected occupancy state of the parking space to the reference occupancy state to check the sensor system for errors.

According to one further aspect, a device for checking a sensor system for detecting an occupancy state of a parking space for motor vehicles, which is included in a motor vehicle, for errors is provided, the device being designed to carry out the method for checking a sensor system for detecting an occupancy state of a parking space for motor vehicles, which is included in a motor vehicle, for errors.

According to one further aspect, a computer program is provided, which includes program code for carrying out the method for checking a sensor system for detecting an occupancy state of a parking space for motor vehicles, which is included in a motor vehicle, for errors if the computer program is executed on a computer.

In accordance with the present invention, an occupancy state of a parking space, which was detected with the aid of the sensor system, is compared to a reference occupancy state of the same parking space, the comparison being carried out only when a time interval (time difference) between the respective detection points in time is less than or less than/equal to a predetermined time difference threshold value. It may then advantageously be assumed that the occupancy state of the parking space has not changed after the first detection point in time, for example because a further motor vehicle has driven onto the parking space or has left it.

If the comparison shows, for example, that the occupancy state detected with the aid of the sensor system agrees with the reference occupancy state, it is in particular determined or decided that the sensor system is operating error-free, i.e., that no error has occurred.

If the comparison shows, for example, that the occupancy state detected with the aid of the sensor system and the reference occupancy state are different from one another, i.e., do not agree, i.e., are not the same, it is in particular determined or decided that the operation of the sensor system is defective, i.e., that an error has occurred.

This yields the technical advantage, for example, that an error in the sensor system may be efficiently identified. This in particular yields the technical advantage that it is possible to efficiently check whether the sensor system is able to detect the correct occupancy state of the parking space.

This thus yields the technical advantage in particular that a concept for efficiently checking a sensor system for detecting an occupancy state of a parking space for motor vehicles, which is included in a motor vehicle, for errors is provided.

The fact that the reference data set including the reference occupancy state was ascertained independently of the sensor system means, in particular, that the reference data set was not ascertained by the sensor system and/or that data ascertained by the sensor system, these data including an occupancy state, for example, were not used to ascertain the reference data set.

The reference data set was ascertained, for example, using sensor systems of other motor vehicles. The reference data set was ascertained, for example, using data including an occupancy state, these data having been collected by persons.

Data of the reference data set, i.e., in particular the reference occupancy state, are thus data, for example, for which it is established or defined and/or in which it is assumed that these are error-free.

If the sensor system to be checked is operating error-free, it would have to detect the occupancy state which corresponds to the reference occupancy state. If this is not the case, it must be assumed that the sensor system to be checked is operating defectively.

However, since an occupancy state may change over time, it is additionally provided according to the present invention that the comparison is carried out only when the time interval between the two detection points in time is less than or less than/equal to the predetermined time difference threshold value. In this way, it is possible to efficiently consider the circumstance that the reference occupancy state may change over time, so that the likelihood that it is mistakenly determined that the sensor system has an error may be efficiently reduced.

An occupancy state within the meaning of the description indicates whether the parking space is occupied or unoccupied, i.e., free.

According to one specific embodiment, the detection of the occupancy state of the parking space is carried out as the motor vehicle drives past the parking space.

According to one specific embodiment, the time difference is dependent on a kind or type of the parking space. For example, a type is one of the following types: "park and ride" parking space, employee parking space, time-limited parking space, short-term parking space.

In the case of a short-term parking space, the time difference is a maximum of 5 minutes, for example.

In the case of a time-limited parking space, in which parking is allowed for a maximum of 2 hours, for example, the time difference, for example, is a maximum of 15 minutes.

For example, the time difference is dependent on a point in time of a last detected parking change, i.e., the point in time when a motor vehicle parked on the parking space was replaced by another motor vehicle.

The time difference is in particular settable, i.e., variable.

One specific embodiment also covers the step of detecting the occupancy state of the parking space with the aid of the sensor system to be checked.

In one specific embodiment, the sensor system to be checked includes one or multiple of the following surroundings sensors for detecting surroundings of the motor vehicle: ultrasonic sensor, LIDAR sensor, laser sensor, magnetic sensor, radar sensor, video sensor, in particular video sensor of a video camera.

The surroundings sensor detects in particular the parking space, in particular the occupancy state of the parking space being ascertained based on this detection.

For example, an image analysis of video data of the video camera is carried out to ascertain the occupancy state of the parking space.

For example, an analysis of radar data of the radar sensor is carried out to ascertain the occupancy state of the parking space.

In general, for example, an analysis of surroundings sensor data which correspond to detected surroundings is carried out to ascertain the occupancy state of the parking space.

In one specific embodiment, it is provided that the reference data set includes a reference position of the parking space, a position of the parking space detected with the aid of the sensor system being received via the communication network, the detected position of the parking space being compared to the reference position to check the sensor system for errors.

This yields the technical advantage, for example, that it is possible to efficiently check whether the sensor system to be checked is able to correctly ascertain the position of the parking space.

One specific embodiment also covers the step of detecting the position of the parking space with the aid of the sensor system to be checked.

In one specific embodiment, it is provided that the sensor system includes a position sensor, for example a GPS sensor, for determining the position of the parking space. It is noted that the position sensor actually determines the position of the sensor system. However, within the meaning of the description it is assumed that the spatial proximity of the sensor system to the parking space during the detection of the occupancy state is such that, in a first approximation, the position of the sensor system corresponds to the position of the parking space (cf. also comments below).

In one further specific embodiment, it is provided that the reference data set includes a reference dimension of the parking space and/or a reference dimension of a further motor vehicle parked on the parking space, a dimension of the parking space detected with the aid of the sensor system and/or a dimension of the further motor vehicle parked on the parking space detected with the aid of the sensor system being received via the communication network, the detected dimension of the parking space being compared to the reference dimension of the parking space and/or the detected dimension of the further motor vehicle parked on the parking space being compared to the reference dimension of the further motor vehicle parked on the parking space, to check the sensor system for errors.

This yields the technical advantage, for example, that it is possible to efficiently check whether the sensor system to be checked is able to correctly ascertain the dimension of the parking space and/or the dimension of the motor vehicle parked on the parking space.

One specific embodiment also covers the step of detecting the dimension of the parking space with the aid of the sensor system to be checked.

A dimension is, for example, a length or a height or a width of the parking space.

For example, the reference data set includes multiple dimensions.

Comments made in conjunction with a dimension apply analogously for multiple dimensions, and vice versa.

In general, it applies within the meaning of the description that when the singular is used for dimension, the plural shall always be implied, and vice versa.

The sensor system thus measures the parking space, for example as the motor vehicle drives past, to determine the dimension of the parking space.

According to one specific embodiment, the sensor system includes a processor, which is designed to analyze the surroundings sensor data in order to ascertain the occupancy state and/or the dimension and/or the position of the parking space.

In one specific embodiment, it is provided that the sensor system is switched off upon detection of an error.

This yields the technical advantage, for example, that it is possible to efficiently avoid that the sensor system provides erroneous results, i.e., for example erroneous occupancy states here. If such results are made available to other road users, these could thus be misled and, for example, drive in vain to a supposedly free parking space to park there. In this way, for example, unnecessary fuel consumption may be avoided.

According to another specific embodiment, it is provided that an error message is output upon detection of an error.

This, for example, yields the technical advantage that, for example, a driver of the motor vehicle may be efficiently notified that the operation of the sensor system is defective, and he/she may schedule an appointment with a repair shop, for example. This yields the technical advantage, for example, that the sensor system may be quickly repaired again.

The output of the error message includes, for example, an output of an acoustic and/or a visual and/or a haptic error message.

This yields the technical advantage, for example, that the driver is able to efficiently detect the error message.

The output of the error message includes, for example, a transmission of an error message via a communication network, for example to a terminal, in particular to a mobile terminal, for example a cell phone.

This yields the technical advantage, for example, that it is also possible to efficiently inform persons presently not situated in the motor vehicle about the error.

For example, the terminal is a server or a computer of a repair shop and/or of a manufacturer of the sensor system and/or of a manufacturer of the motor vehicle.

In one specific embodiment, it is provided that, upon detection of an error, a message that the operation of the sensor system is defective and/or that the sensor system should be further checked is transmitted via the communication network to a terminal, in particular to a terminal included in the motor vehicle.

This, for example, yields the technical advantage that, for example, a driver of the motor vehicle may be efficiently notified that the operation of the sensor system is defective, and he/she may schedule an appointment with a repair shop, for example. This yields the technical advantage, for example, that the sensor system may be quickly repaired again.

In one specific embodiment, it is provided that an occupancy state of a parking space detected with the aid of the sensor system is ignored upon detection of an error.

This yields the technical advantage, for example, that it is possible to efficiently avoid that erroneous results of the sensor system, i.e., for example erroneous occupancy states here, are made available to other road users. These could thus be misled and, for example, drive in vain to a supposedly free parking space to park there. In this way, for example, unnecessary fuel consumption may be avoided.

If, for example, the sensor system transmits data via a communication network to a server which, for example, is part of a cloud infrastructure, these are rejected by the server, for example, i.e., not accepted in the first place.

According to one specific embodiment, the device is such a server.

According to one specific embodiment, it is provided that an error is already detected when it is established for the first time for a single parking space that the comparison showed a difference.

This yields the technical advantage, for example, that it is possible to immediately respond to a difference, so that response times to this difference may be efficiently reduced. In particular, for example, the driver of the motor vehicle may be directly notified that the operation of the sensor system is defective.

In one further specific embodiment, it is provided that an error is not detected until it has been established several times for multiple parking spaces that the comparison showed a difference.

This yields the technical advantage, for example, that one-time, i.e., singular, erroneous measurements or miscalculations do not cause the operation of the sensor system to be wrongly classified as being defective. This avoids unnecessary error messages.

The comparison includes, in particular, the comparison with respect to the occupancy state and/or with respect to the position and/or with respect to the dimension.

In one specific embodiment, a communication interface is provided, which is designed to communicate via a communication network, in particular a wireless communication network. This communication includes, in particular, a reception and/or a transmission of the occupancy state and/or of the position and/or of the dimension.

The device includes such a communication interface, for example.

The motor vehicle includes such a communication interface, for example.

The motor vehicle thus, for example, transmits the occupancy state and/or the position and/or the dimension detected with the aid of the sensor system to the device via a communication network.

The device thus, for example, receives the occupancy state and/or the position and/or the dimension detected with the aid of the sensor system via a communication network.

In one specific embodiment, a processor is provided, which is designed to carry out the comparison or the comparisons.

The wording "respectively" includes in particular the wording "and/or."

Technical functionalities of the method are derived analogously from corresponding technical functionalities of the device, and vice versa.

Device features are derived analogously from corresponding method features, and vice versa.

A communication network includes a wireless communication network, for example, which includes a WLAN communication network and/or a mobile communication network, for example.

In one specific embodiment, the motor vehicle includes a position sensor for determining a position of the motor vehicle.

In one specific embodiment, the sensor system includes a position sensor for determining a position of the motor vehicle.

According to one specific embodiment, a position sensor is a GPS sensor.

It is noted that the position sensor actually determines the position of the sensor system and/or of the motor vehicle. However, within the meaning of the description it is assumed that the spatial proximity of the sensor system to the parking space during the detection of the occupancy state is such that, in a first approximation, the position of the sensor system and/or of the motor vehicle corresponds to the position of the parking space.

According to one specific embodiment, a comparison of a position of the parking space detected with the aid of the sensor system of the motor vehicle to the reference position is carried out independently of the comparison of the ascertained time difference to the predetermined time difference threshold value. In general, a position of a parking space will not change.

According to an alternative specific embodiment, a comparison of a position of the parking space detected with the aid of the sensor system of the motor vehicle to the reference position is carried out as a function of the comparison of the ascertained time difference to the predetermined time difference threshold value, so that the comparison with respect to the position is carried out only when the ascertained time difference is less than or less than/equal to the predetermined time difference threshold value. Parking spaces may no longer be available due to a construction site, for example.

However, by specifying the time difference, the circumstance that construction sites generally take some time until they are completed may be taken into consideration.

According to one specific embodiment, a comparison of a dimension of the parking space detected with the aid of the sensor system of the motor vehicle to the reference dimension is carried out independently of the comparison of the ascertained time difference to the predetermined time difference threshold value. In general, a dimension of a parking space does not change, in particular when the parking space is visually delimited from other parking spaces with markings.

According to an alternative specific embodiment, a comparison of a dimension of the parking space detected with the aid of the sensor system of the motor vehicle to the reference position is carried out as a function of the comparison of the ascertained time difference to the predetermined time difference threshold value, so that the comparison with respect to the dimension is carried out only when the ascertained time difference is less than or less than/equal to the predetermined time difference threshold value. Parking spaces may change their dimensions due to a construction site, for example. However, by specifying the time difference, the circumstance that construction sites generally take some time until they are completed may be taken into consideration.

Furthermore, in this way it is possible to consider the circumstance that drivers, when parking their motor vehicles, do not always adhere to markings which delimit the individual parking spaces from one another, so that sometimes wider and sometimes narrower free parking spaces are available, depending on the parked motor vehicles.

The present invention is described in greater detail below based on preferred exemplary embodiments.

BRIEF DESCRIPTION OF THE DRAWINGS

FIG. 3 shows multiple motor vehicles driving past parking spaces.

DETAILED DESCRIPTION OF EXAMPLE EMBODIMENTS

Figure 1:
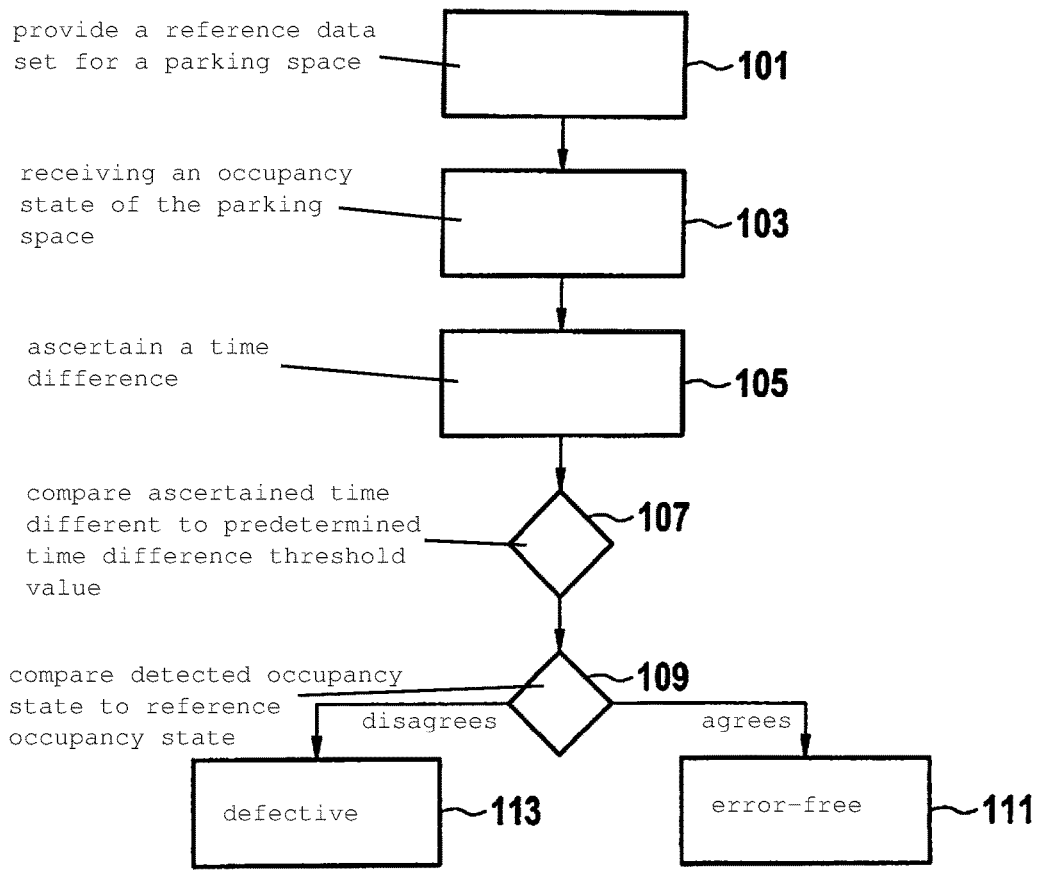
FIG. 1 shows a flow chart of a method for checking a sensor system for detecting an occupancy state of a parking space for motor vehicles, which is included in a motor vehicle, for errors.

FIG. 1 shows a flow chart of a method for checking a sensor system for detecting an occupancy state of a parking space for motor vehicles, which is included in a motor vehicle, for errors.

The method includes the following steps:
providing 101 a reference data set for a parking space ascertained independently of the sensor system to be checked, the reference data set including a reference occupancy state of the parking space, the reference occupancy state being assigned a first detection point in time which indicates when the reference occupancy state was detected;
receiving 103 an occupancy state of the parking space detected with the aid of the sensor system of the motor vehicle via a communication network, the occupancy state being assigned a second detection point in time which indicates when the occupancy state was detected with the aid of the sensor system, the second detection point in time being chronologically after the first detection point in time;
ascertaining 105 a time difference between the first and the second detection points in time;
comparing 107 the ascertained time difference to a predetermined time difference threshold value, and
when the ascertained time difference is less than or less than/equal to the predetermined time difference threshold value, comparing 109 the detected occupancy state of the parking space to the reference occupancy state to check the sensor system for errors.

If comparison 109 shows that the occupancy state detected with the aid of the sensor system agrees with the reference occupancy state, it is determined 111 that the sensor system is operating error-free, i.e., that no error has occurred.

If comparison 109 shows that the occupancy state detected with the aid of the sensor system and the reference occupancy state are different from one another, i.e., do not agree, i.e., are dissimilar, it is determined 113 that the operation of the sensor system is defective, i.e., that an error has occurred. In this case, it is provided, for example, that a message that the operation of the sensor system is defective and/or that the sensor system should be further checked is transmitted via the communication network to a terminal, in particular to a terminal included in the motor vehicle, for example a motor vehicle internal communication component, for example a main control unit ("head unit") of the motor vehicle.

A terminal within the meaning of the description is a mobile terminal, for example, in particular a cell phone. For example, the terminal is a cell phone which a driver of the motor vehicle including the sensor system to be checked carries.

If comparison 107 shows that the ascertained time difference is greater than or greater than/equal to the predetermined time difference threshold value, step 109 is refrained from. This step 109 is then not carried out. Due to the ascertained time difference, it is assumed here that the occupancy state has changed in the meantime and/or has changed with a likelihood greater than 50%, so that comparison 109 will not yield a reliable result.

Figure 2:
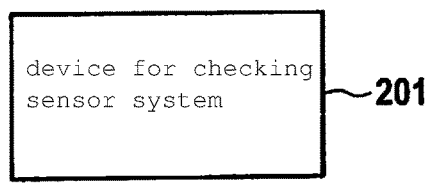
FIG. 2 shows a device for checking a sensor system for detecting an occupancy state of a parking space for motor vehicles, which is included in a motor vehicle, for errors.

FIG. 2 shows a device 201 for checking a sensor system for detecting an occupancy state of a parking space for motor vehicles, which is included in a motor vehicle, for errors, device 201 being designed to carry out the method for checking a sensor system for detecting an occupancy state of a parking space for motor vehicles, which is included in a motor vehicle, for errors.

Device 201 includes a processor for carrying out steps 107 through 113, for example.

For example, device 201 includes a communication interface, which is designed to receive the occupancy state detected with the aid of the sensor system via a communication network, in particular a wireless communication network.

Device 201 is a server or designed as a server, for example. The server and/or device 201 is part of a cloud infrastructure according to one specific embodiment.

In one specific embodiment, it is provided that device 201 receives a respective occupancy state of a shared parking space from a plurality of further motor vehicles via the communication interface. These respective occupancy states are assigned a respective detection point in time, which indicates when the respective further motor vehicle has detected the occupancy state.

Based on these respective occupancy states, for example the reference occupancy state is ascertained, for example in that the respective occupancy states are averaged.

Based on these respective detection points in time, for example the first detection point in time is ascertained, which is assigned to the reference occupancy state, for example in that the respective occupancy states are averaged.

If the motor vehicle including the sensor system to be checked now drives past the same parking space, it will detect the occupancy state and transmit it, together with a second detection point in time which indicates when the sensor system detected the occupancy state, via the communication network to device 201. Device 201 will then, as described above and hereafter, compare the occupancy state detected with the aid of the sensor system to the reference occupancy state to identify errors in the sensor system.

FIG. 3 shows multiple motor vehicles 301, 303, 305, 307 driving past two parking spaces 309, 311 in the driving direction (arrow 310).

A motor vehicle 313 is parked on the first parking space 309. The first parking space 309 is occupied.

No motor vehicle is parked on the second parking space 311. The second parking space 311 is unoccupied, i.e., free.

The multiple motor vehicles 301, 303, 305, 307 each include a sensor system (not shown) for detecting an occupancy state of a parking space for motor vehicles.

The respective sensor systems detect the corresponding occupancy state as each of these pass by the two parking spaces 309, 311. This detection is symbolically shown in the drawing with wave-shaped elements denoted by reference numeral 315.

Each of motor vehicles 301, 303, 305, 307 transmits the detected occupancy state, which in each case is assigned a detection point in time (as described above), via a wireless communication network to a remote server (not shown).

The server receives the occupancy states and, based on the occupancy states of vehicles 301, 303, 305, ascertains a respective reference occupancy state for parking spaces 309, 311 and a first detection point in time.

If a time difference between the detection point in time assigned to the occupancy state detected with the aid of the sensor system of motor vehicle 307, which corresponds to the second detection point in time within the meaning of the description, and the first detection point in time is less than or less than/equal to a predetermined time difference threshold value, the occupancy state detected with the aid of the sensor system of motor vehicle 307 is compared to the reference occupancy state.

If the operation of the sensor system of motor vehicle 307 is error-free, the occupancy state for the first parking space 309 should be indicated as occupied, and the occupancy state for the second parking space 311 should be indicated as free.

Otherwise, it is determined, for example, that the operation of the sensor system of motor vehicle 307 is defective. In this case, the server, for example, transmits a message via the wireless communication network to motor vehicle 307 so that, for example, a driver of motor vehicle 307 may be informed about the defective sensor system.

In one specific embodiment, it is provided that an error is detected only when both occupancy states of parking spaces 309, 311 detected with the aid of the sensor system of motor vehicle 307 do not agree with the respective reference occupancy states.

In another specific embodiment, it is provided that an error is already detected when the occupancy state of parking space 311 does not agree with the corresponding reference occupancy state.

In one further specific embodiment, it is provided that, in addition to the occupancy state, a dimension and/or a position of parking spaces 309, 311 are detected with the aid of the sensor systems of the motor vehicles. The positions and/or dimensions detected with the aid of the sensor systems are transmitted analogously to the occupancy state to the server from the respective motor vehicle via the wireless communication network.

Analogously to the occupancy states, the server will then ascertain, for example based on the received positions and/or dimensions, a respective reference position and/or a respective reference dimension for the two parking spaces 309, 311, and then compare these to the position and/or dimension detected with the aid of the sensor system of motor vehicle 307 to detect errors in the sensor system of motor vehicle 307.

According to one specific embodiment, a one-time deviation related to the occupancy state also already suffices here for an error to be detected.

According to one specific embodiment, multiple deviations related to the occupancy state must occur for an error to be detected.

In summary, the concept according to the present invention is in particular based on checking, based on a parking space having a known position and a known occupancy state, whether or not a sensor system for detecting an occupancy state of a parking space for motor vehicles, which is included in the motor vehicle, is operating error-free. The knowledge of the known position and the known occupancy state of the parking space is ascertained independently of the sensor system to be checked. This knowledge is assumed to be correct. This knowledge thus forms the reference (reference data set).

However, this knowledge must not be too old, but should preferably be up to date, since occupancy states may generally change over time.

By specifying the time difference threshold value, it is efficiently ensured that the knowledge, which is used as a basis for the decision as to whether or not the sensor system has an error, is not too old. Only knowledge which, relative to the second detection point in time, is more recent than the time difference threshold value is used to decide whether or not the sensor system has an error. If knowledge is older, a comparison based on this older knowledge will be refrained from.

The sensor system to be checked detects the occupancy state of the parking space and/or measures the parking space, for example as the motor vehicle drives past the parking space, to ascertain one or multiple dimensions of the parking space and/or determines or ascertains a position of the parking space. The results (occupancy state, dimension, position), which are ascertained with the aid of the sensor system to be checked, are compared to the known knowledge and should agree with this, if the operation of the sensor system to be checked is error-free, i.e., is correct. Otherwise, i.e., in the event of non-agreement, i.e., a difference between the results of the sensor system and the known knowledge, the sensor system is switched off, for example, and/or an error message is output. As described above, these comparisons, however, are carried out only when the ascertained time difference is less than or less than/equal to the predetermined time difference threshold value.

What is claimed is:

1. A method for checking a sensor system for detecting an occupancy state of a parking space for motor vehicles, which is included in a motor vehicle, for errors, the method comprising:
   providing a reference data set for a parking space ascertained independently of the sensor system to be checked, the reference data set including a reference occupancy state of the parking space, the reference occupancy state being assigned a first detection point in time which indicates when the reference occupancy state was detected;
   receiving an occupancy state of the parking space detected with the aid of the sensor system of the motor vehicle via a communication network, the occupancy state being assigned a second detection point in time which indicates when the occupancy state was detected with the aid of the sensor system, the second detection point in time being chronologically after the first detection point in time;
   ascertaining a time difference between the first and the second detection points in time;
   comparing the ascertained time difference to a predetermined time difference threshold value; and
   when the ascertained time difference is less than or less than/equal to the predetermined time difference threshold value, comparing the detected occupancy state of the parking space to the reference occupancy state to check the sensor system for errors.

2. The method as recited in claim 1, wherein the reference data set includes a reference position of the parking space, a position of the parking space detected with the aid of the sensor system being received via the communication network, the detected position of the parking space being compared to the reference position to check the sensor system for errors.

3. The method as recited in claim 1, wherein the reference data set includes at least one of: (i) a reference dimension of the parking space, (ii) a reference dimension of a further motor vehicle parked on the parking space, (iii) a dimension of the parking space detected with the aid of the sensor system, and (iv) a dimension of the further motor vehicle parked on the parking space detected with the aid of the sensor system being received via the communication network.

4. The method as recited in claim 3, wherein, to check the sensor system for errors, at least one of: (i) the detected dimension of the parking space is compared to the reference dimension of the parking space, and (ii) the detected dimension of the further motor vehicle parked on the parking space is compared to the reference dimension of the further motor vehicle parked on the parking space.

5. The method as recited in claim 1, wherein, upon detection of an error, a message that at least one of: (i) the operation of the sensor system is defective, and (ii) the sensor system should be further checked, is transmitted via the communication network to a terminal included in the motor vehicle.

6. The method as recited in claim 1, wherein an occupancy state of a parking space detected with the aid of the sensor system is ignored upon detection of an error.

7. The method as recited in claim 1, wherein an error is already detected when it is established for the first time for a single parking space that the comparison yielded a difference.

8. The method as recited in claim 1, wherein an error is not detected until it has been established several times for multiple parking spaces that the comparison yielded a difference.

9. A device for checking a sensor system for detecting an occupancy state of a parking space for motor vehicles, which is included in a motor vehicle, for errors, wherein the device is designed to:
   provide a reference data set for a parking space ascertained independently of the sensor system to be checked, the reference data set including a reference occupancy state of the parking space, the reference occupancy state being assigned a first detection point in time which indicates when the reference occupancy state was detected;
   receive an occupancy state of the parking space detected with the aid of the sensor system of the motor vehicle via a communication network, the occupancy state being assigned a second detection point in time which indicates when the occupancy state was detected with the aid of the sensor system, the second detection point in time being chronologically after the first detection point in time;
   ascertain a time difference between the first and the second detection points in time;
   compare the ascertained time difference to a predetermined time difference threshold value; and
   when the ascertained time difference is less than or less than/equal to the predetermined time difference threshold value, compare the detected occupancy state of the parking space to the reference occupancy state to check the sensor system for errors.

10. A non-transitory computer-readable storage medium on which is stored a computer program, including program code for checking a sensor system for detecting an occupancy state of a parking space for motor vehicles, which is included in a motor vehicle, for errors, the computer program, when executed by a processor, causing the processor to perform:
   providing a reference data set for a parking space ascertained independently of the sensor system to be checked, the reference data set including a reference occupancy state of the parking space, the reference occupancy state being assigned a first detection point in time which indicates when the reference occupancy state was detected;
   receiving an occupancy state of the parking space detected with the aid of the sensor system of the motor vehicle via a communication network, the occupancy state being assigned a second detection point in time which indicates when the occupancy state was detected with the aid of the sensor system, the second detection point in time being chronologically after the first detection point in time;
   ascertaining a time difference between the first and the second detection points in time;
   comparing the ascertained time difference to a predetermined time difference threshold value; and
   when the ascertained time difference is less than or less than/equal to the predetermined time difference threshold value, comparing the detected occupancy state of the parking space to the reference occupancy state to check the sensor system for errors.

* * * * *